US007630183B2

(12) United States Patent
Shin

(10) Patent No.: US 7,630,183 B2
(45) Date of Patent: Dec. 8, 2009

(54) ESD INDUCING APPARATUS IN MOBILE COMMUNICATION TERMINAL WITH FINGERPRINT RECOGNITION FUNCTION

(75) Inventor: Jun-Kyun Shin, Seoul (KR)

(73) Assignee: Pantech Co., Ltd., Seoul (KR)

( * ) Notice: Subject to any disclaimer, the term of this patent is extended or adjusted under 35 U.S.C. 154(b) by 329 days.

(21) Appl. No.: 11/129,543

(22) Filed: May 13, 2005

(65) Prior Publication Data

US 2005/0275996 A1    Dec. 15, 2005

(30) Foreign Application Priority Data

Jun. 11, 2004    (KR) .................... 10-2004-0043012

(51) Int. Cl.
*H05F 3/00* (2006.01)
(52) U.S. Cl. .................. 361/56; 361/112; 361/220; 382/124
(58) Field of Classification Search ............... 361/220, 361/56, 120; 382/124
See application file for complete search history.

(56) References Cited

U.S. PATENT DOCUMENTS

| 4,322,777 | A | * | 3/1982 | Ueta et al. ................ 361/748 |
| 4,869,170 | A | * | 9/1989 | Dahmberg et al. ........ 102/202.5 |
| 4,945,442 | A | * | 7/1990 | Brockschmidt et al. ...... 361/56 |
| 5,892,669 | A | * | 4/1999 | Shin ............................ 363/50 |
| 6,414,297 | B1 |  | 7/2002 | Sasaki et al. |
| 6,483,931 | B2 | * | 11/2002 | Kalnitsky et al. ........... 382/124 |
| 2003/0108226 | A1 | * | 6/2003 | Goodman et al. .......... 382/124 |
| 2003/0179001 | A1 | * | 9/2003 | Ito et al. .................... 324/661 |
| 2003/0215116 | A1 | * | 11/2003 | Brandt et al. ............... 382/124 |

FOREIGN PATENT DOCUMENTS

| JP | 2001-120519 | 5/2001 |
| JP | 2002-033469 | 1/2002 |
| JP | 2002-175523 | 6/2002 |
| JP | 2002-246488 | 8/2002 |
| KR | 1020010051651 A | 6/2001 |
| KR | 20-0229981 | 7/2001 |

* cited by examiner

*Primary Examiner*—Rexford N Barnie
*Assistant Examiner*—Nicholas Ieva
(74) *Attorney, Agent, or Firm*—H.C. Park & Associates, PLC

(57) ABSTRACT

The provided is an electrostatic discharging (ESD) inducing apparatus in a mobile communication terminal with a fingerprint recognition function. The ESD inducing apparatus includes: a fingerprint recognizing unit for obtaining fingerprint information by contacting with a fingerprint of a human finger, which is provided to one side of the mobile communication terminal; a printed circuit board provided with a mounting unit contacting with the fingerprint recognizing unit for receiving the fingerprint information from the fingerprint recognizing unit; and a ground unit for inducing a static electricity caused by contacting with the fingerprint, which is provided to the printed circuit board adjacent to the mounting unit.

11 Claims, 4 Drawing Sheets

ESD INDUCING APPARATUS IN MOBILE COMMUNICATION TERMINAL WITH FINGERPRINT RECOGNITION FUNCTION

CROSS REFERENCE TO RELATED APPLICATION

This application claims priority from and the benefit of Korean Patent Application No. 10-2004-0043012, filed on Jun. 11, 2004, which is hereby incorporated by reference for all purposes as if fully set forth herein.

FIELD OF THE PRESENT INVENTION

The present invention is related to an electrostatic discharge (ESD) inducing apparatus in a mobile communication terminal; and, in particular, to an ESD inducing apparatus for inducing an ESD to a ground to thereby protect a semiconductor device, which is vulnerable to a static electricity, from the static electricity in a mobile communication terminal.

DESCRIPTION OF RELATED ARTS

A wireless communication terminal includes a mobile communication terminal, a Personal Communication Service (PCS), a Personal Digital Assistance (PDA), a smart phone, an International Mobile Telecommunication (IMT)-2000 and a wireless Local Area Network (LAN) terminal capable of transmitting and receiving multimedia contents, e.g., text, voice, and image and moving picture.

As the mobile communication terminal is used generally and widely, the mobile communication terminal provide services in connection with a mobile Internet, an electronic cash replenishment, financial settlement, a mobile banking, etc., other than a voice communication service. Therefore, the wireless communication terminal becomes complicated and has multifunction and thereby a security problem occurred.

In order to solve the security problem, a mobile communication terminal having a fingerprint recognition sensor for performing user verification using a fingerprint is proposed. The mobile communication terminal having a fingerprint recognition function strengthens the security to thereby prevent using the mobile communication terminal by another party and protect a financial transaction based on the mobile communication terminal.

However, because a semiconductor device included in a fingerprint apparatus is contacted with a hand of a human body directly, there are risks to be shock of the static electricity from the outside and thereby the semiconductor may be damaged or may operate incorrectly due to an electric noise due to an ESD.

Herein, the ESD is a phenomenon that an excessive positive electric charge or negative electric charge is accumulated in a place due to friction, exfoliation, contact, heat energy, a liquid flow, etc., between the two sides and thereby an electric spark is generated by discharging a high voltage instantly. In other words, energy in a charged object is discharged in an instant due to dielectric strength destruction of neighboring media or a contact with a ground object. Problems caused by the static energy occur in various fields; and, in particular, in a semiconductor field, as the semiconductor devices are decreased in size, e.g., a junction depth, a gate oxide and a transistor, to improve performance, reliability and economical efficiency, anti-static resistance of the semiconductor device is decreased. Due to the ESD, the damage risk of the semiconductor is increased more and more.

In particular, because the fingerprint recognizing apparatus obtains the fingerprint information by using the semiconductor, which is based on a non-optical sensor scheme in a small volume and can be mass produced, in the mobile communication terminal of which size and weight are decreased more and more, the semiconductor is exposed to the outside directly to thereby have the risk of the ESD.

Therefore, an ESD solution for the fingerprint is required and a research thereof is conducted.

FIG. 1 is a perspective view showing a conventional fingerprint recognizing apparatus in a mobile communication terminal.

As shown, the conventional fingerprint recognizing apparatus in the mobile communication terminal includes a fingerprint recognizing unit 10, a mounting unit 20 and a printed circuit board 30.

The fingerprint recognizing unit 10 obtains fingerprint information by contacting with the outside. The printed circuit board 30 processes the fingerprint information from the fingerprint recognizing unit 10 and includes the mounting unit 20 for mounting the fingerprint recognizing unit 10.

As mentioned above, the conventional fingerprint recognizing apparatus in the mobile communication terminal has the fingerprint recognizing unit 10 including the semiconductor device in order to contact with the outside object. Therefore, the static electricity may be inputted from the outside such as the ESD caused by the contact with the human body during a fingerprint verification process. The static electricity causes a malfunction or a damage on the semiconductor and thereby brings about an economical loss.

In other words, there is a countermeasure against the ESD that occurs in each element inside the mobile communication terminal. However, the damage on the semiconductor, in which the ESD frequently occurs, cannot be prohibited, and therefore, a solution for the ESD that occurs in the fingerprint recognizing unit exposed to the outside, and a method for implementing thereof are not provided.

To solve the above problem, an electrostatic consuming unit used for a door-lock system using the fingerprint recognition may be applied. However, the electrostatic consuming unit requires space to be installed and the wireless communication terminal, which becomes small in size and light in weight, does not have a room for an additional device such as the electrostatic consuming unit.

SUMMARY OF THE INVENTION

It is, therefore, an object of the present invention to provide an ESD inducing apparatus for protecting the semiconductor in the fingerprint recognizing apparatus from the ESD by changing a structure of a conductive discharge inducing pad in order to induce the ESD to the ground based on an available range of the static electricity.

In accordance with an aspect of the present invention, there is also provided an electrostatic discharge (ESD) inducing apparatus in a mobile communication terminal with a fingerprint recognition function, including: a fingerprint recognizing unit for obtaining fingerprint information by contacting with a fingerprint of a human finger, which is provided to one side of the mobile communication terminal; a printed circuit board provided with a mounting unit contacting with the fingerprint recognizing unit for receiving the fingerprint information from the fingerprint recognizing unit; and a ground unit for inducing a static electricity caused by contacting with the fingerprint, which is provided to the printed board adjacent to the mounting unit.

In accordance with an aspect of the present invention, there is also provided a mobile communication terminal having an electrostatic discharge (ESD) inducing apparatus, including: a fingerprint recognizing unit for obtaining fingerprint information by contacting with a fingerprint of a human finger, which is provided to one side of the mobile communication terminal; a printed circuit board provided with a mounting unit contacting with the fingerprint recognizing unit for receiving the fingerprint information from the fingerprint recognizing unit; and a ground unit for inducing a static electricity caused by contacting with the fingerprint, which is provided to the printed circuit board adjacent to the mounting unit.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Other objects and benefits of the present invention will be described hereinafter, and will be recognized according to an embodiment of the present invention. Hereinafter, an ESD inducing apparatus in a mobile communication terminal having a fingerprint recognition function will be described in detail with reference to the accompanying drawings.

Figure 1:
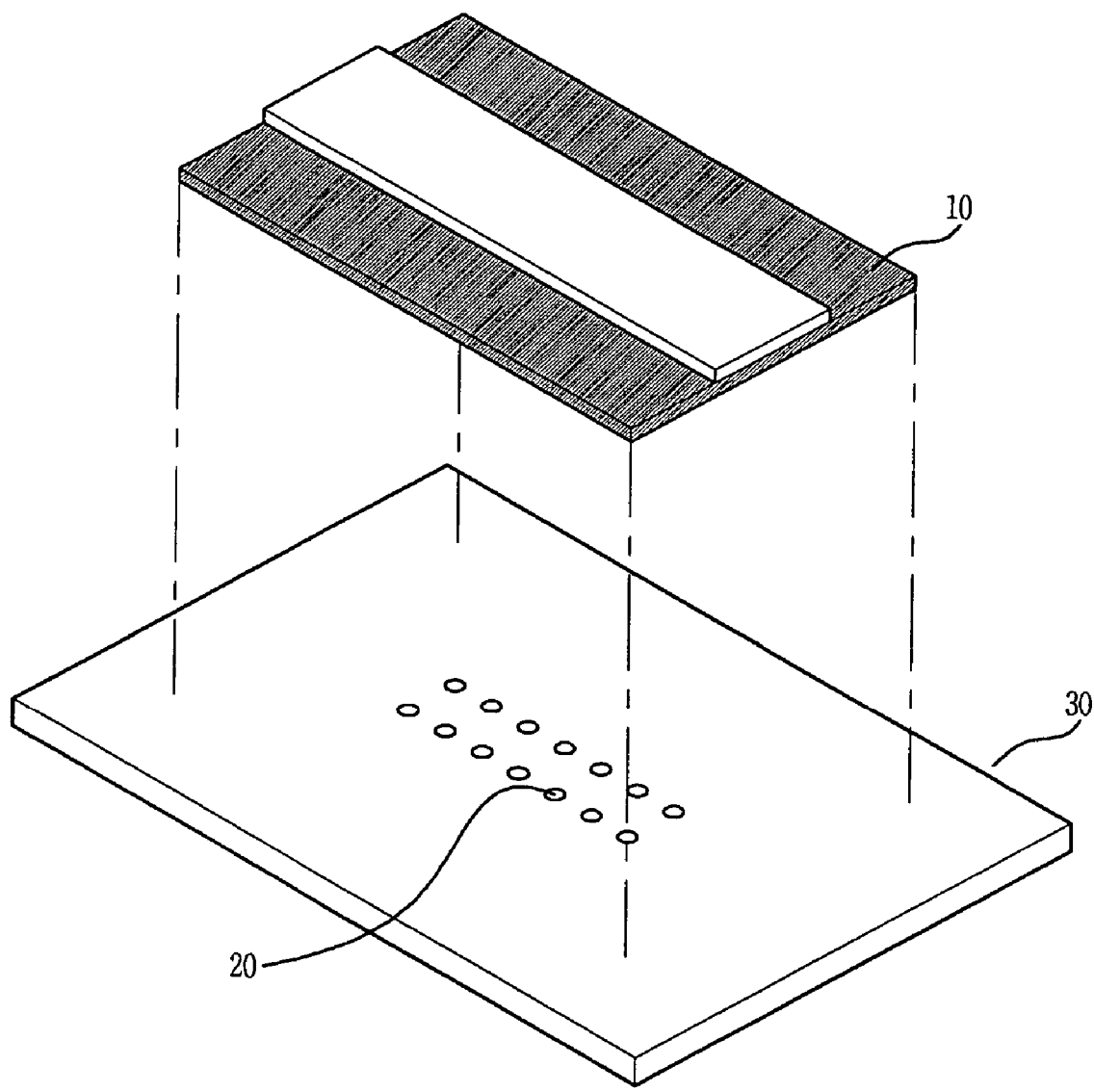
FIG. 1 is a perspective view showing a conventional fingerprint recognizing apparatus in a mobile communication terminal.
Figure 2:
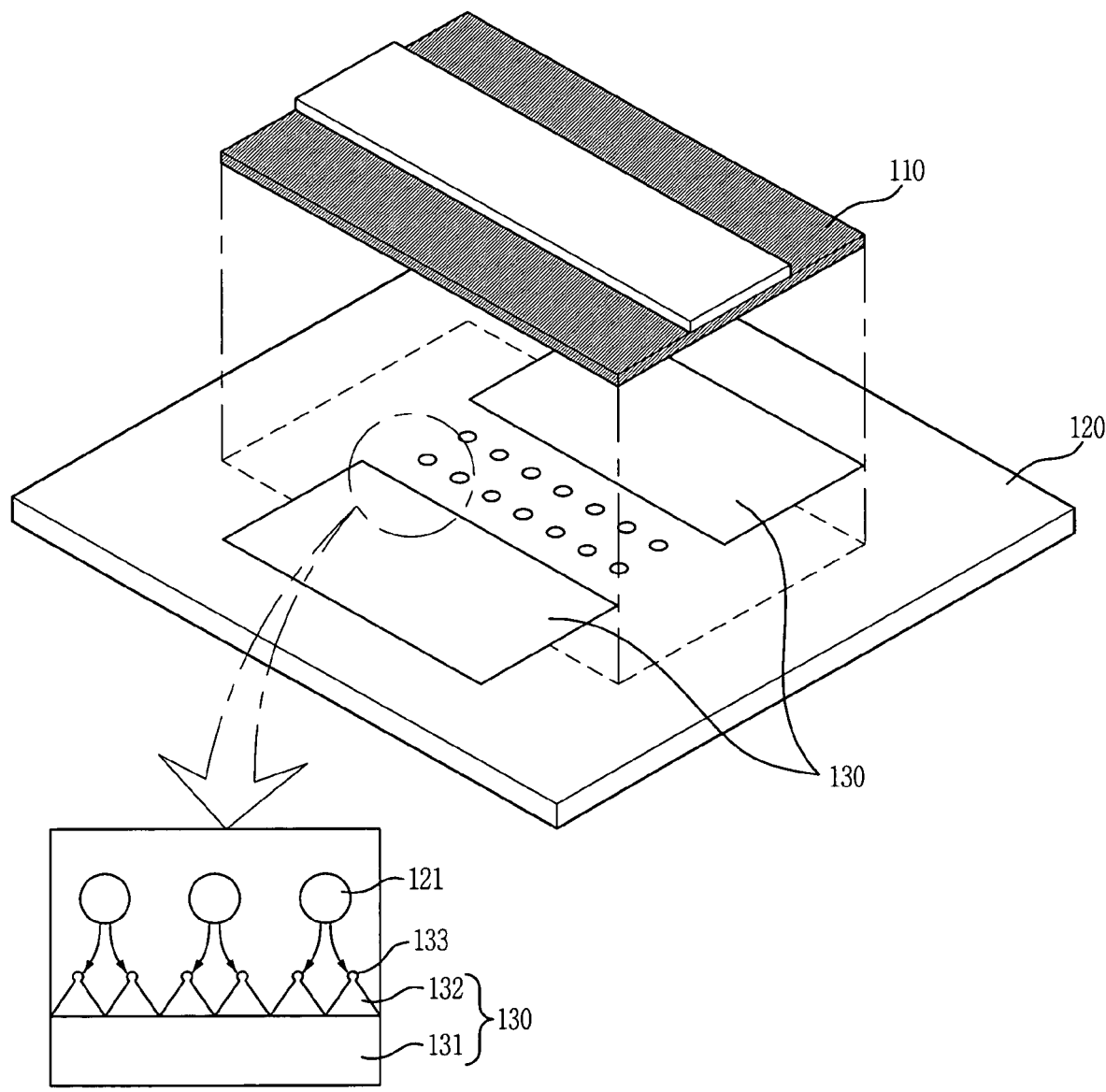
FIG. 2 is an exploded perspective view describing a fingerprint recognizing apparatus having a function for inducing an electrostatic discharge (ESD) in accordance with the present invention.
Figure 3:
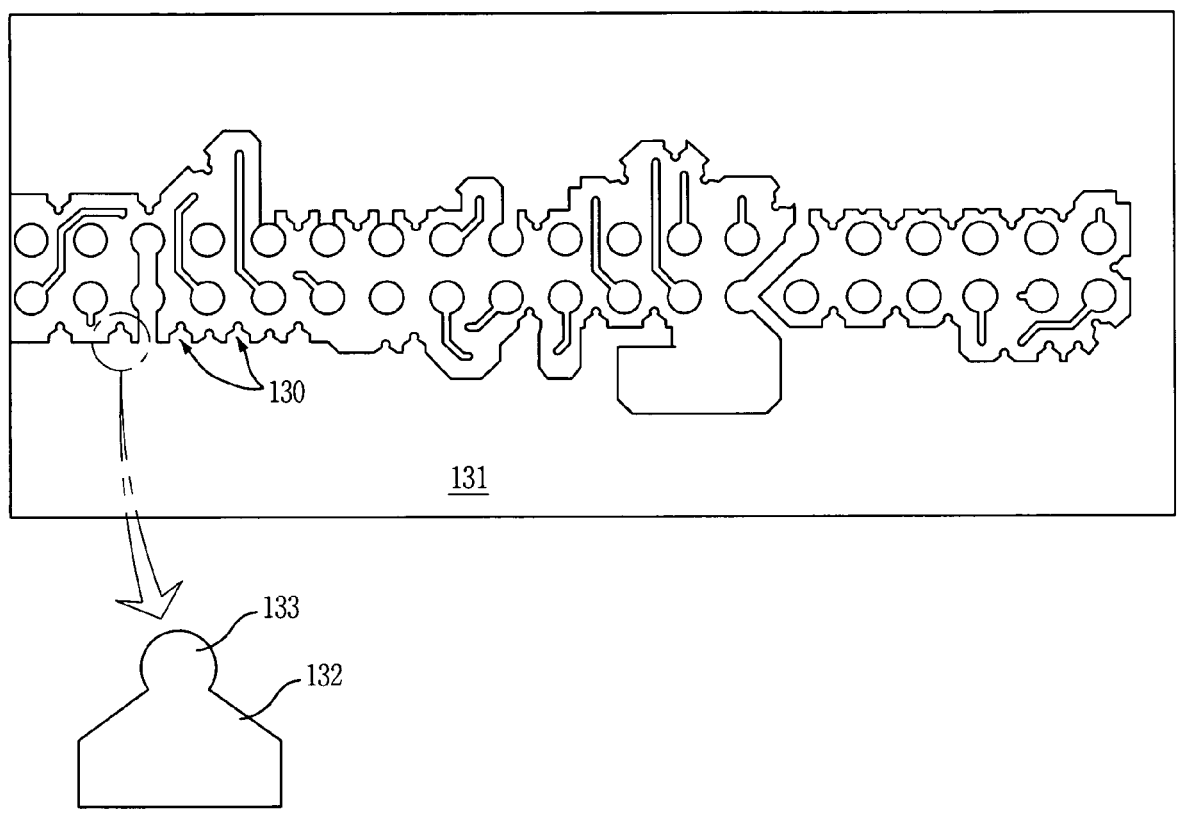
FIG. 3 is a block diagram illustrating a ground unit of the fingerprint recognizing apparatus in accordance with the embodiment of the present invention.

FIG. 2 is an exploded perspective view describing a fingerprint recognizing apparatus having a function for inducing an electrostatic discharge (ESD) in accordance with the present invention; and FIG. 3 is a block diagram illustrating a ground unit of the fingerprint recognizing apparatus in accordance with the embodiment of the present invention.

As shown in FIG. 2, the ESD inducing apparatus in the mobile communication terminal includes a fingerprint recognizing unit 110, a printed circuit board 120 and a ground unit 130.

The fingerprint recognizing unit 110, which is provided to one side of the mobile communication terminal, obtains fingerprint information by contacting with a fingerprint and includes a fingerprint recognizing sensor. The printed circuit board 120, which is provided with a plurality of contacting balls 121 served as a mounting unit connected to the fingerprint recognizing unit 110, receives the fingerprint information from the fingerprint recognizing unit 110. The ground unit 130, which is provided to the printed circuit board 120 adjacent to the contacting ball 121, induces an ESD with a high voltage/high energy caused by contacting with the fingerprint to the ground.

The ground unit 130 is provided in a form of a patterned thin film and includes an ESD ground pad 131 and a plurality of projection pads 132. The ESD ground pad 131 confronts the mounting unit. The plurality of projection pads 132 is projected on one side of the ESD ground pad 131 and induces the static electricity flowed along a surface of the fingerprint recognizing unit 110 to the ESD ground pad 131.

Herein, the ESD ground pad 131 is formed in a shape of a wide plain plate in order to induce the static electricity to the ground regardless of an influx direction of the static electricity when the static electricity occurred at the ground unit 130 is flowed along the surface of the fingerprint recognizing unit 110.

It is desirable that the projection pad 132 is formed of the triangles whose peak is toward to the mounting unit consecutively in order to induce an influx static electricity to the ESD ground pad 131 successfully when the static electricity due to the ESD is flowed through a signal line of the fingerprint recognizing unit 110.

Herein, a circle-shaped or polygonal-shaped expansion part 133 can be formed at a peak of the projection pad 132 in the shape of the triangle in order to induce certainly the static electricity to the ESD ground pad 131.

It is desirable that the projection pad 132 is spaced apart from the contacting ball 121 so that the expansion part is not shorted with the contacting ball 121 of the printed circuit board 120.

The ground unit 130 is formed on one side or both of the sides that confronts to the contacting ball 121, which is connected to the fingerprint recognizing unit 110. Also, the ground unit 130 can be formed in circumference of the contacting ball 121 in consecutive or in a specific distance.

FIG. 3 is a block diagram illustrating a ground unit of the fingerprint recognizing apparatus in accordance with the embodiment of the present invention, wherein the ground unit 130 is provided with a projection pad 132 having an expansion part 133.

As shown in FIG. 3, a plurality of projection pads 132 and expansion part 133 of the ground unit 130 are formed on one side of the ESD ground pad 131 and spaced apart from the contacting balls 121 so that they are not shorted with the contacting balls 121 made from a lead, which connects the fingerprint recognizing unit 110 to the printed circuit board 120.

The ground unit 130 is formed in a shape of a triangle having a width of 0.3 mm which is apart from the ESD ground pad 131 with a space of 0.25 mm and the expansion part 133 is formed in a shape of a circle having a radius of 0.04 mm in order to induce certainly the static electricity.

Figure 4:
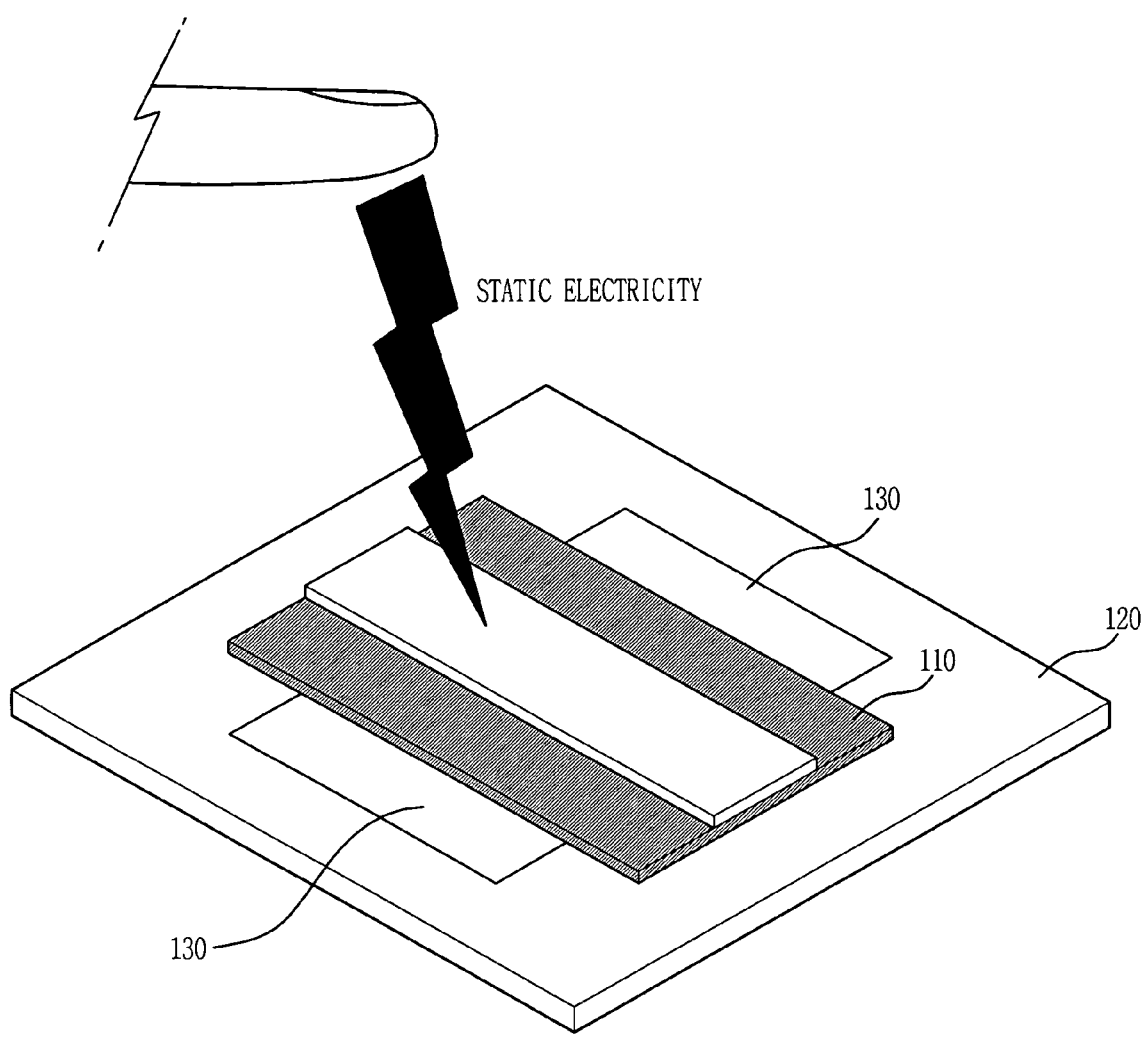
FIG. 4 is a perspective view describing an operation of the ESD inducing apparatus in accordance with the present invention.

The ESD inducing apparatus in the mobile communication terminal of the present invention will be described in accompanying with FIG. 4. FIG. 4 is a perspective view describing an operation of the ESD inducing apparatus in accordance with the present invention.

When a human hand is closed to the fingerprint recognizing unit 110 to thereby obtain the fingerprint information, the static electricity may occur due to the ESD. The static electricity is flowed to the printed circuit board 120 or an inner circuit of the printed circuit board 120 through a surface of the fingerprint recognizing unit 110. Herein, the static electricity is not flowed to the printed circuit board 120 but is induced by the ground unit 130 provided to the printed circuit board 120 and thereby the semiconductor is protected from the damage.

Because the static electricity flowed through the fingerprint recognizing unit 110 is induced to the ground certainly by the electrostatic inducing projecting pad 132 and the expansion part 133 provided with the ground unit, the damage of the semiconductor is prohibited reliably.

As mentioned above, the ESD inducing apparatus of the present invention decreases damage risk of the semiconductor device from the static electricity having high voltage and high energy and thereby inconvenience due to break down or changes of elements is decreased.

Also, the present invention does not need additional cost or a space because the present invention does not use an additional device, such as the electrostatic consuming unit described in the background, for protecting against ESD.

The present application contains subject matter related to Korean patent application No. 2004-43012, filed in the Korean Intellectual patent office on Jun. 11, 2004, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An electrostatic discharge (ESD) inducing apparatus in a mobile communication terminal with a fingerprint recognition function, comprising:
    a fingerprint recognizing device to obtain fingerprint information by contacting with a fingerprint of a human finger, the fingerprint recognizing device being provided on one side of the mobile communication terminal;
    a printed circuit board provided with a mounting device contacting with the fingerprint recognizing device to receive the fingerprint information from the fingerprint recognizing device, the mounting device comprising a plurality of contact balls on the printed circuit board; and
    a ground device to induce a static electricity caused by contacting with the fingerprint, the ground device being provided to the printed circuit board adjacent to the mounting device, wherein the ground device comprises a patterned thin film disposed on the printed circuit board, and the patterned thin film includes:
    an ESD ground pad located proximate to the mounting device of the printed circuit board, and
    a plurality of protection pads projecting from the ESD ground pad toward the contact balls of the mounting device to induce the ESD from the fingerprint recognizing device to the ground pad,
    wherein a first protection pad comprises a body portion and an expand portion attached to the body portion, wherein the body portion comprises a proximal end and a distal end, wherein the body portion is tapered along a direction from the proximal end to the distal end, and wherein the expanded portion is attached to the distal end.

2. The ESD inducing apparatus as recited in claim 1, wherein the ESD ground pad is in a shape of a wide plain.

3. The ESD inducing apparatus as recited in claim 2, wherein the expanded portion is circular or polygonal.

4. A fingerprint screening system, comprising:
    a fingerprint sensor having a fingerprint recognition surface to receive a fingerprint and to generate fingerprint information if a finger contacts the fingerprint recognition surface;
    an electrical contact connected to the fingerprint sensor to provide an electrical connection with a fingerprint information processing circuit, the electrical contact comprising a plurality of contact balls; and
    an electrostatic discharge bypass comprising a patterned thin film disposed on the fingerprint information processing circuit and located proximate to the electrical contact, wherein the patterned thin film comprises a substantially equipotential pad and a plurality of projecting pads connected to and projecting from the substantially equipotential pad toward the contact balls of the electrical contact,
    wherein a first protection pad comprises a body portion and an expanded portion attached to the body portion, wherein the body portion comprises a proximal end and a distal end, wherein the body portion is tapered along a direction from the proximal end to the distal end, and wherein the expanded portion is attached to the distal end.

5. The system of claim 4, wherein the expanded portion is circular or polygonal.

6. The system of claim 4, wherein the electrostatic discharge bypass is not physically connected to the electrical contact.

7. The system of claim 4, wherein the electrostatic discharge bypass comprises at least one electrostatic discharge current receiver to receive an electrostatic discharge current from the fingerprint sensor via the electrical contact.

8. The system of claim 7, wherein the at least one electrostatic discharge current receiver is substantially electrically grounded.

9. The system of claim 4, wherein the fingerprint sensor comprises a fingerprint sensor chip having the fingerprint recognition surface integrated thereon.

10. The system of claim 4, wherein the system is part of a portable electronic device.

11. The system of claim 4, wherein the system is part of a wireless telecommunication device.

* * * * *

UNITED STATES PATENT AND TRADEMARK OFFICE
CERTIFICATE OF CORRECTION

PATENT NO. : 7,630,183 B2  Page 1 of 1
APPLICATION NO. : 11/129543
DATED : December 8, 2009
INVENTOR(S) : Jun-Kyun Shin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Second Day of November, 2010

David J. Kappos
*Director of the United States Patent and Trademark Office*